United States Patent [19]

Upshaw et al.

[11] Patent Number: 4,593,922
[45] Date of Patent: Jun. 10, 1986

[54] COMBINATION NESTING STOP AND STABILIZER BRACKET FOR SHOPPING CARTS

[75] Inventors: Clarence W. Upshaw, Tuttle; Russell D. Begley, Oklahoma City; James F. Reinbold, Norman, all of Okla.

[73] Assignee: UNR Industries, Inc., Chicago, Ill.

[21] Appl. No.: 637,490

[22] Filed: Aug. 3, 1984

[51] Int. Cl.[4] .............................................. B62B 11/00
[52] U.S. Cl. ........................ 280/33.99 A; 280/33.99 S
[58] Field of Search ................. 280/33.99 A, 33.99 R, 280/33.99 S

[56] References Cited

U.S. PATENT DOCUMENTS 2,898,123 8/1959 Davis et al. ............... 280/33.99 R
3,813,111 5/1974 Ruger ......................... 280/33.99 A

*Primary Examiner*—David M. Mitchell
*Assistant Examiner*—Eric Culbreth
*Attorney, Agent, or Firm*—Clement and Ryan

[57] ABSTRACT

A combination nesting stop and stabilizer bracket for use with a shopping cart having a lading-carrying basket of wire construction constructed so that one shopping cart can be telescoped within a cart of similar construction during storage of the carts. The device prevents the basket from being twisted out of shape to force the bottom portion of the hinged rear wall of the basket into the gap on either side between that bottom portion and the side walls of the basket. At the same time, it prevents the bight of the relatively heavy wire U-shaped rear rim element of the basket framework of a first cart from being forced into a gap between the bottom wires of the basket and the horizontally disposed support element at the front of the tubular elevated support frame of a second cart that is telescoped within the first cart.

4 Claims, 8 Drawing Figures

4,593,922

COMBINATION NESTING STOP AND STABILIZER BRACKET FOR SHOPPING CARTS

This application relates to a novel combination nesting stop and stabilizer bracket for use with a shopping cart having a lading-carrying basket of wire construction, and in particular a shopping cart in which the chassis frame, the lading-carrying basket and the basket's supporting frame are constructed so that one shopping cart can be telescoped within a cart of similar construction during storage of the carts.

BACKGROUND OF THE INVENTION

Shopping carts having their lading-carrying baskets and supporting frameworks constructed in such a manner that the carts can be telescoped together during storage of the carts have been known for many years.

Typically such a cart includes a tubular elevated support frame carried by a tubular chassis frame that has four wheels pivotally secured to the bottom of the chassis. The elevated support frame ordinarily has a tubular horizontal cross member at its front end. The lading-carrying basket, which is mounted on the elevated support frame, has commonly been made of wire construction in which a multiplicity of generally parallel thin wire elements have been secured to a heavier wire framework.

The chassis frame, the basket and its supporting tubular frame in a telescoping shopping cart of the type described are tapered inwardly from side to side from the back to the front, with the bottom wall of the basket tilted upward from back to front, so that when desired one cart can fit within another similar cart. The side walls and bottom wall of the lading-carrying basket usually terminate at the rear of the basket in a forwardly facing U-shaped heavy wire rim element.

The rear wall of the basket is ordinarily hinged at the top, so that when it is desired to telescope two similarly constructed shopping carts to minimize the space required for storage of the carts, the basket of the rear or second cart can push into the interior of the basket of the first shopping cart and cause the hinged rear wall of the first shopping cart to swing up out of the way. Because of the inward taper from the rear to the front of the lading-carrying basket, the side walls of the basket are of course closer together at the forward end than they are at the rear of the basket. This means that for the hinged rear wall to avoid striking the side walls of the basket when it is displaced upward and forward during telescoping of two carts, the width of the bottom portion of that rear wall must be sufficiently less than the width of the basket at the basket's rear end that the forwardly displaced wall will be somewhat narrower than the basket's narrow forward portion. This produces a horizontal gap of predetermined size, on both sides of the bottom portion of the rear wall, between it and the side walls of the basket when the rear wall is in its closed, generally vertical position.

With the shopping cart construction as just described, because of tolerances in the manufacturing process there is very often a sizable vertical gap between the above mentioned horizontally disposed support element at the front end of the tubular elevated support frame and the horizontally disposed, thin, parallel wire elements that comprise the bottom wall of the lading-carrying basket support on that frame.

Two unrelated problems, each of considerable importance, have presented themselves with telescoping shopping carts of the described construction.

One of these problems is that the distorting forces that are exerted against lading-carrying baskets of wire construction during ordinary usage, as the carts are pushed and bumped around the floor of a typical store, frequently force the rear section of a basket out of shape, thereby causing the bottom portion of the rear wall of the basket to be moved to one side or the other into one of the above described horizontal gaps that are present on both sides of that bottom wall portion. This distortion of the basket and its rear wall can take place while the rear wall is in its closed, generally vertical position. Then, with the basket thus twisted out of shape, when the rear wall of the basket is swung upward during telescoping, it will jam against one side wall or the other of the basket, thus preventing the rear wall from opening up all the way and preventing the two carts from fully nesting.

The second troublesome problem arises from (1) the presence of the above mentioned vertical gap between the horizontally disposed tubular support member at the front end of the elevated support frame and the bottom wall of the lading-carrying basket of one cart, and (2) the fact that when the hinged rear wall of the other cart is swung upward for telescoping, the bight or horizontal portion of the relatively heavy wire U-shaped rear rim element of the basket framework of that cart is quite exposed. The problem presented is that when two shopping carts are fully telescoped, the exposed horizontal portion of the relatively thick rear wire rim element of the front cart is often pushed into the gap between the bottom wires of the wire basket and the horizontally disposed support element at the front of the tubular elevated support frame of the rear cart. This can cause the two carts to be wedged or stuck together so firmly that it is difficult, and sometimes even impossible, to pull the rear cart away from the cart with which it is telescoped.

Applicants have unexpectedly discovered that both these longstanding problems can be overcome by use of a single novel fitting that acts as both a nesting stop and a stabilizer bracket.

SUMMARY OF THE INVENTION

The combination nesting stop and stabilizer bracket of this invention includes a bracket having an inverted U-shaped cross section, with the bottom end portion of each downwardly extending leg of the U-shaped member defining a downwardly opening notch. Each notch in a downwardly extending leg receives the horizontally disposed portion of the relatively thick rear wire rim member of the framework of the lading-carrying basket of the shopping cart. The invention also includes means for mounting the inverted U-shaped member on the shopping cart with the horizontally disposed portion of the relatively thick rear wire rim member within the notches in the legs.

As indicated above, the combination nesting stop and stabilizer bracket of this invention is used in a shopping cart that has a hinged rear wall that has a predetermined spacing from the adjacent side wall of the lading-carrying basket on each side of the bottom portion of the hinged wall. The distance between the outer surfaces of the downwardly extending legs of the inverted U-shaped bracket is approximately equal to the predetermined spacing on each side of the bottom portion of the hinged rear wall and the adjacent side wall of the basket.

As a result of the construction described, the combination nesting stop and stabilizing bracket of this invention achieves two results. First, the downwardly extending legs of the inverted U-shaped bracket prevent the relatively thick rear wire rim member of the basket of the front shopping cart from being forced into any gap that exists between the thin wire elements of the bottom wall of the lading-carrying basket and the tubular horizontal cross member at the front end of the rear shopping cart which is pushed within the front cart for telescoping therewith. Second, the inverted U-shaped member—together with a similar U-shaped member positioned at the other end of the rear wire rim member of the lading-carrying basket of the shopping cart—confine the bottom portion of the hinged rear wall of the shopping cart basket to stabilize that rear wall.

BRIEF DESCRIPTION OF THE DRAWINGS

This invention will now be described with reference to the attached drawings in which.

DETAILED DESCRIPTION OF ONE EMBODIMENT

Figure 1:
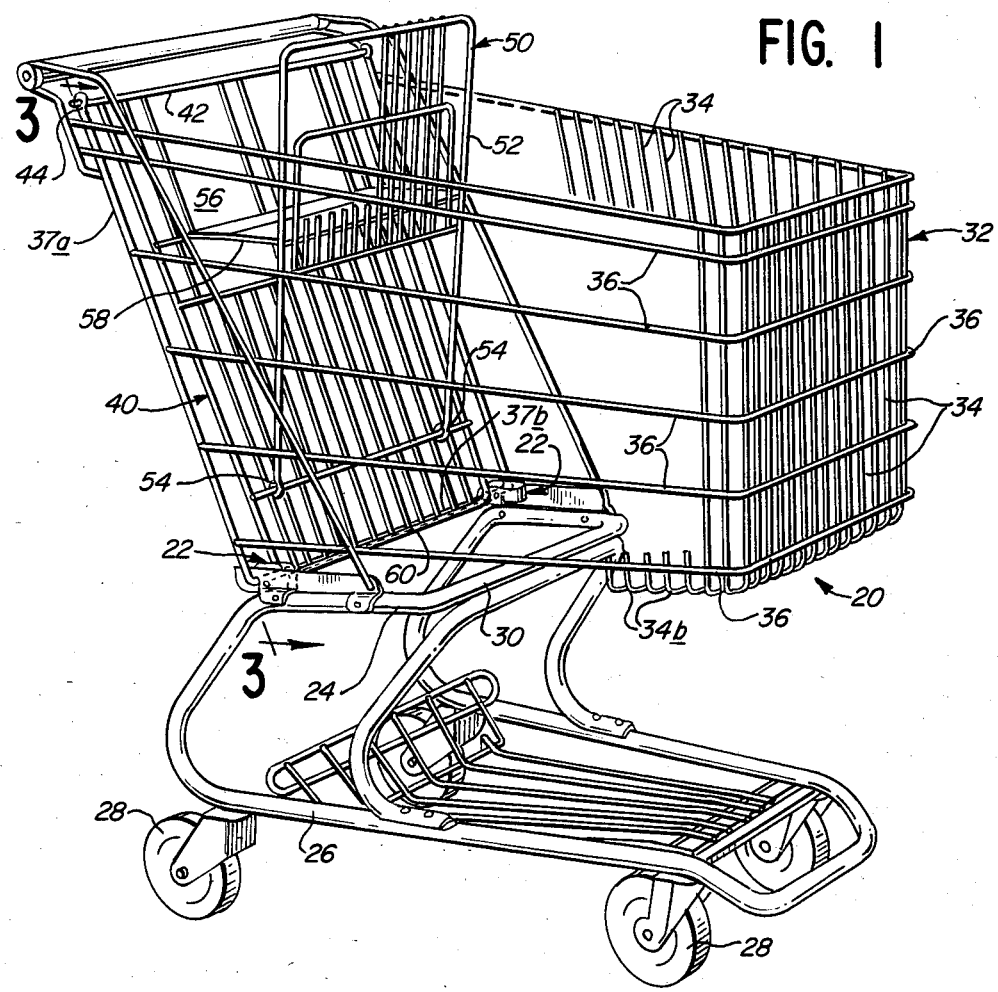
FIG. 1 is a three-quarters perspective view from the side of a typical shopping cart with which the device of this invention may be used, including a baby seat structure within the lading-carrying basket that is hinged at its bottom end to the rear wall of the basket, with the device of this invention in place on each side of the bottom portion of the hinged rear wall of the cart.

Shopping cart 20 shown in FIG. 1 is a typical cart with which combination nesting stop and stabilizer bracket 22 of this invention can be used. As will be indicated in FIG. 5 below, shopping cart 20 is constructed so as to receive within it a second, similar shopping cart in nesting or telescopic relationship.

Shopping cart 20 includes tubular elevated support frame 24 carried by tubular chassis frame 26, which has four rotatable wheels 28 pivotally secured at the bottom of the chassis. Elevated support frame 24 has a tubular horizontal cross member 30 at its front end.

Lading-carrying basket 32 is supported on elevated support frame 24. Basket 32 comprises a multiplicity of generally parallel, thin wire elements 34 secured to a framework formed of relatively thick wires 36. In FIG. 1, most of the thin wire elements 34 of which basket 32 is formed are omitted for clarity.

Figure 2:
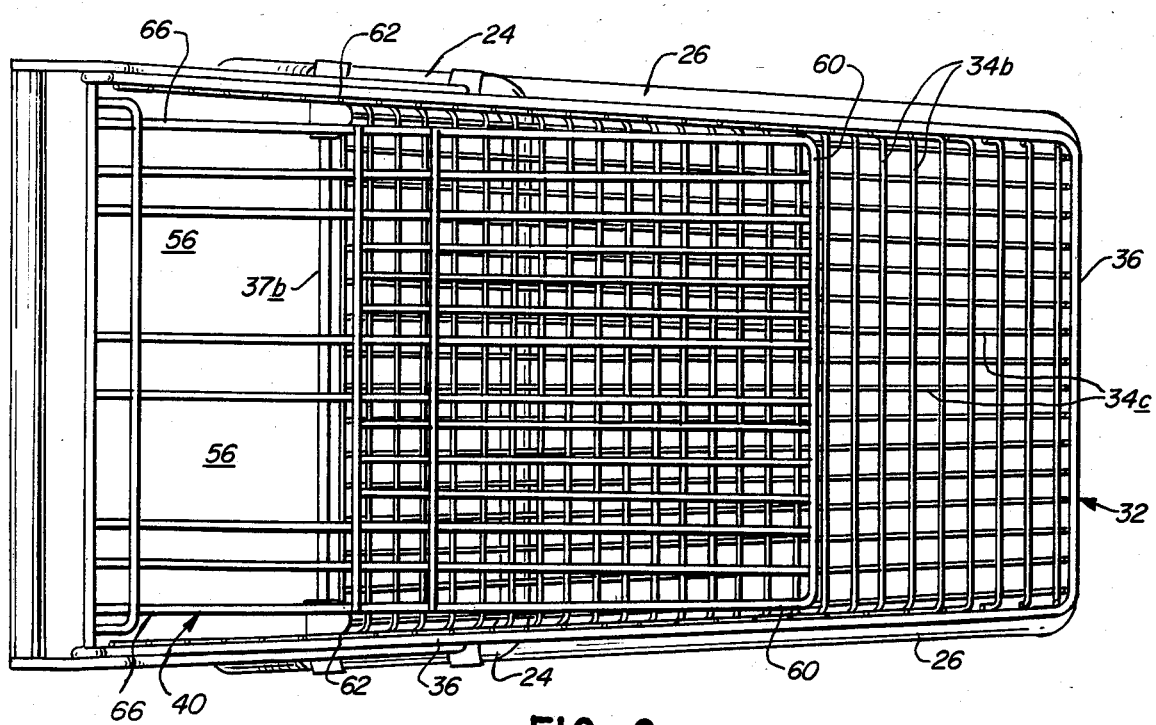
FIG. 2 is a top plan view of the shopping cart of FIG. 1, with the baby seat omitted for clarity, and the hinged rear wall swung forward as it is when a second shopping cart is telescoped within the cart shown during storage of the two carts.

As best seen in FIG. 2, tubular elevated support frame 24, tubular chassis frame 26 and lading-carrying basket 32 are all tapered inwardly from back to front of shopping cart 20. In addition, as is best seen in FIG. 1, elevated support frame 24 and the bottom wall of basket 32 are tilted upward from back to front of the cart. This arrangement of parts permits a second, similar shopping cart to be telescoped within shopping cart 20 when it is desired to store the carts together.

Rear wall 40 of shopping cart 20 is seen from FIG. 1 to be hinged at its top portion 42 to the framework of basket 32. The hinged connection is provided by hinges 44 at the top ends of relatively thick wire vertical members 37a of the basket framework. This hinged relationship permits rear wall 40 to swing inward into the interior of basket 32—as best seen in FIG. 2—when two shopping carts are telescoped together for storage.

Baby seat 50 is a conventional seat for infants that includes back rest 52 hinged at its lower end 54 to rear wall 40 so that when not in use it can be collapsed against the rear wall. The wires of hinged rear wall 40 define two leg holes 56 in which the infant's legs may be accommodated when the baby seat is in use. Seat bottom 58 (seen in FIG. 1 and omitted for clarity from FIG. 2) is hinged to rear wall 40 so that it can be swung down for use as a part of the baby seat, or swung up to close leg holes 56 when the seat is not in use and is collapsed against rear wall 40.

As will be seen, when a second shopping cart is rolled forward against the shopping cart shown in FIG. 1, baby seat 50 can be collapsed against rear wall 40 and the hinged rear wall can be pushed by the advancing second shopping cart up into the position shown in FIG. 2 (where, as mentioned above, the baby seat is not shown). As seen from FIG. 2, because of the inward taper from back to front in lading-carrying basket 32, the inwardly converging side walls of the basket require that bottom portion 60 of hinged rear wall 40 be of a narrower width than rear portion 62 of the basket when the rear wall is in a generally vertical position.

Figure 3:
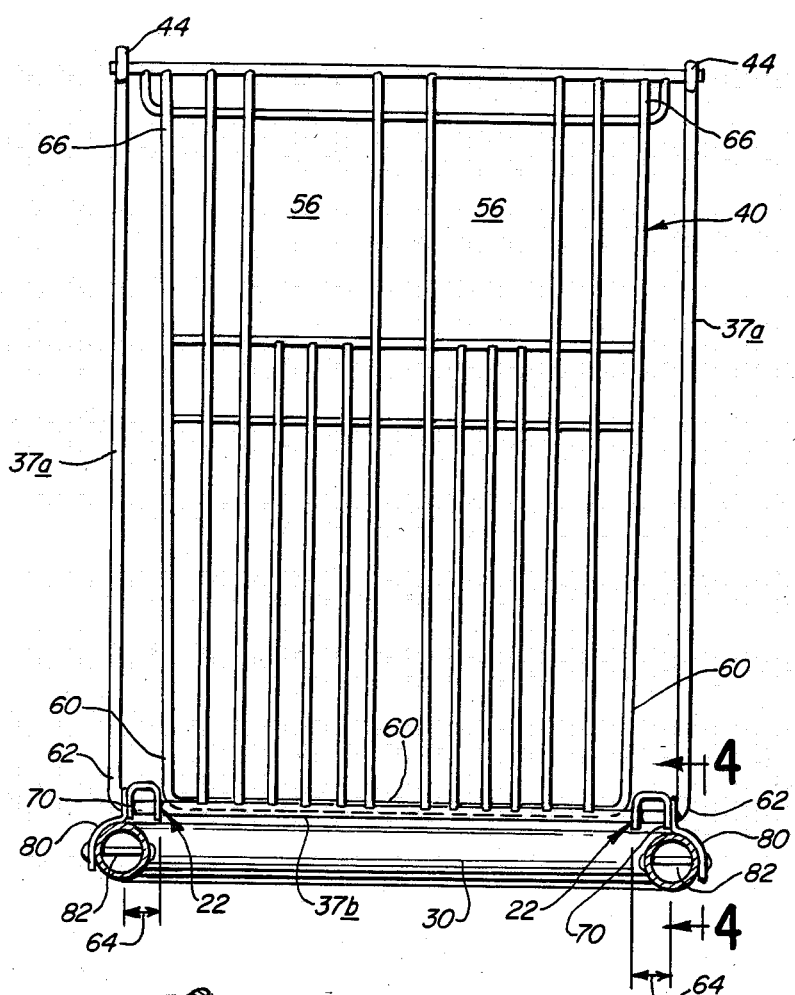
FIG. 3 is a rear elevation of the shopping cart of FIG. 1, taken along the line 3—3 of FIG. 1, showing the rear wall of the basket hinged at its top end, with the combination nesting stop and stabilizer bracket of this invention in place on each side of the bottom end of the hinged rear wall.

Because, as just explained, bottom portion 60 of hinged rear wall 40 must be narrower than rear portion 62 of lading-carrying basket 32, rear wall 40 has a predetermined spacing or gap 64 on each side of its bottom portion 60 between that bottom portion and the respective side wall 62 of basket 32 when the rear wall is disposed generally vertically. Predetermined gaps 64 are best seen in FIG. 3. If desired, bottom portion 60 of hinged rear wall 40 may also be (as is true of the embodiment of FIGS. 1–3) slightly narrower than top portion 66 of the rear wall.

Combination nesting stop and stabilizing brackets 22 are seen in FIG. 3 on either side of bottom portion 60 of hinged rear wall 40, located in the gap between portion 60 and the adjacent bottom portion 62 of the respective vertical portions 37a of the rear wire rim member.

As best seen in FIGS. 1 and 3, the wire framework of lading-carrying basket 32 includes not only horizontally disposed, relatively thick wire member 36 but also a generally vertically oriented, relatively thick U-shaped rear wire rim member at the rear end of the bottom wall and side walls of the lading-carrying basket. The U-shaped rear wire rim member includes vertical elements 37a and horizontally disposed bight portion 37b connecting the two vertical members.

The bottom wall of basket 32 is formed of a plurality of horizontally disposed, generally parallel, laterally extending, thin, bottom wire elements 34b and a similar plurality of longitudinally extending thin wire elements 34c. Typically, longitudinally extending elements 34c are positioned, as shown in FIG. 2, beneath laterally extending thin wire elements 34b.

As mentioned above, during ordinary usage of a shopping cart, quite large distorting forces are exerted against the lading-carrying basket of the cart as the carts are pushed and bumped around on the floor of a typical store. As will be seen from FIG. 3, if it were not for the stabilizing function of members 22, a substantial laterally directed distorting force exerted against shopping cart 20 could cause basket 32 to be forced out of shape. As a result, bottom portion 60 of hinged rear wall 40 could be caused to be moved to one side or the other into gap 64 on either side of the rear wall. This could cause basket 32 to exhibit excessive sidewise sway or other undesirable sidewise movement.

In addition, it will be seen from FIG. 2 that if the distortion of basket 32 is great enough, when hinged rear wall 40 is swung upward during telescoping its bottom portion 60 will jam against one side wall or the other of the basket.

Preventing such distortion and the resulting undesirable effects is one important advantage of the combination nesting stop and stabilizing bracket of this invention.

Figure 4:
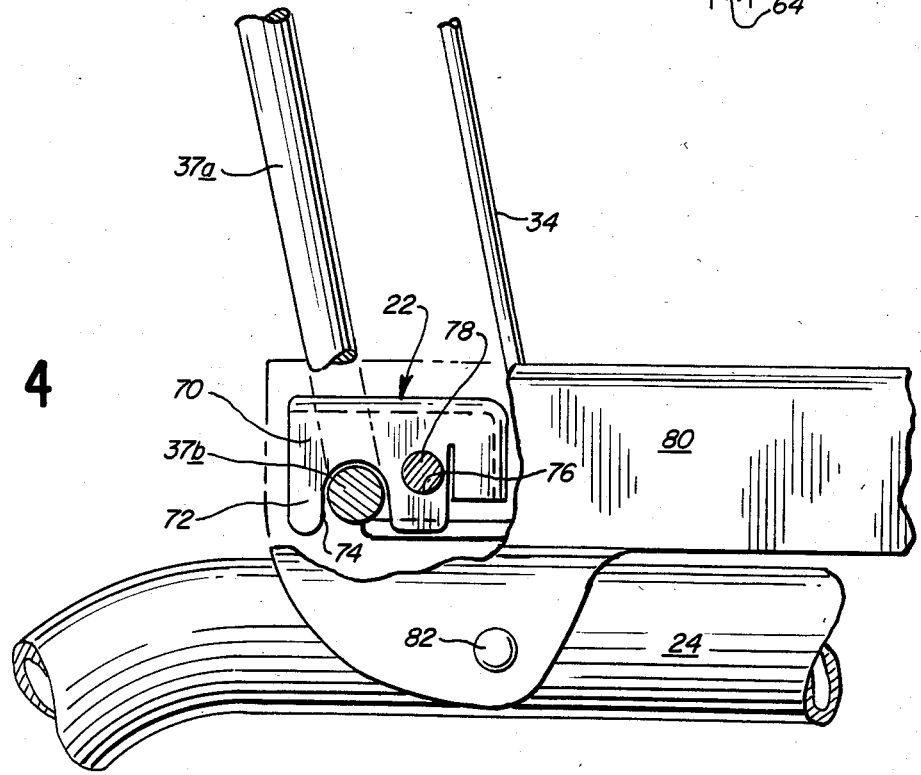
FIG. 4 is a fragmentary side elevation of the shopping cart of FIG. 1, partially broken away, showing the combination nesting stop and stabilizer bracket of this invention secured to a side plate that is attached to the tubular elevated support frame of the shopping cart.

FIG. 4 illustrates a preferred form of mounting nesting stop and stabilizer bracket 22 of this invention on shopping cart 20. Combination nesting stop and stabilizer bracket 22 (as best seen in FIG. 3) has an inverted U-shaped cross section, with two downwardly extending portions 70 defining the inverted U. The distance between the outer surfaces of downwardly extending legs 70 is approximately equal to the predetermined spacing or gap 64 on each side of bottom portion 60 of hinged rear wall 40.

FIG. 4 shows how bottom end portion 72 of each downwardly extending leg 70 defines downwardly opening notch 74. Notch 74 receives horizontally disposed portion 37b of the rear wire rim member of the framework of lading-carrying basket 32 of the shopping cart.

In a preferred form of mounting device 22 on shopping cart 20, at least one downwardly extending leg 70 defines hole 76 to receive connector means 78 (shown in section) for securing device 22 to side plate 80. Side plate 80 is in turn attached to tubular elevated support frame 24 through connector means 82. Side plate 80 can be seen in FIG. 3 with combination nesting stop and stabilizer bracket 22 attached to the plate at both ends of tubular elevated support frame 30.

In the embodiment shown in the drawings, hole 76 for receiving connector means 78 is defined by both of the two downwardly extending legs 70 of inverted U-shaped member 22. The same form of combination nesting stop and stabilizer bracket 22 can thus readily be secured to shopping cart 32, as seen in FIG. 3, on either side of hinged rear gate 40.

Figure 6:
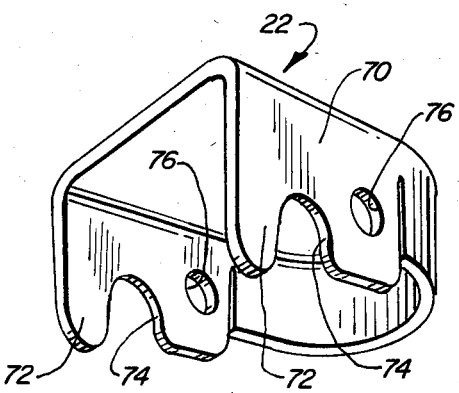
FIG. 6 is a slightly enlarged three-quarters perspective view, from the bottom, of the embodiment of the nesting stop and stabilizer bracket of this invention shown in FIG. 5.
Figure 7:
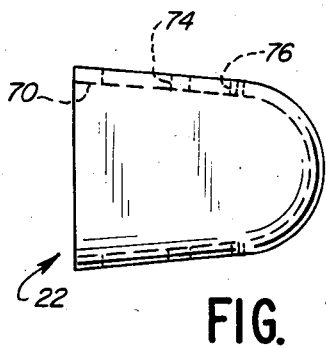
FIG. 7 is a top plan view of the embodiment of the combination nesting stop and stabilizer bracket of this invention shown in FIG. 5.
Figure 8:
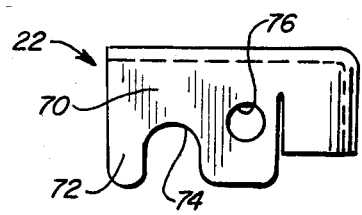
FIG. 8 is a side elevation of the nesting stop and stabilizer bracket of FIG. 7.

FIGS. 6, 7 and 8 provide other views of combination nesting stop and stabilizer bracket 22 of this invention. They show various views of downwardly extending legs 72, downwardly opening notches 74 and connector-receiving holes 76.

Figure 5:
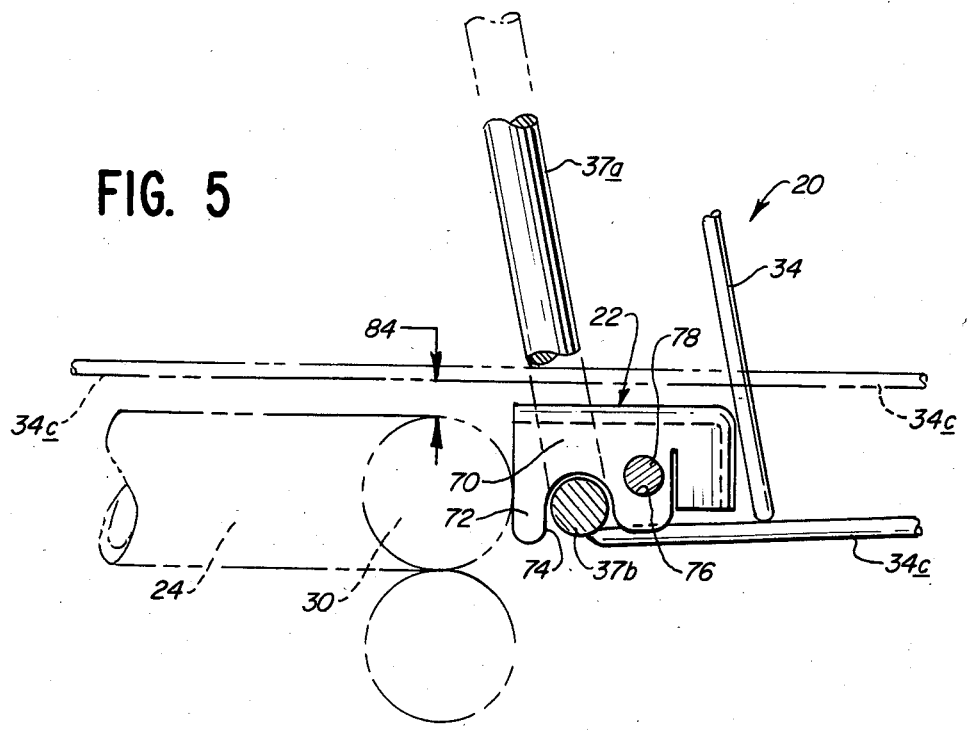
FIG. 5 is a fragmentary side elevation of the shopping cart of FIG. 1 showing the combination nesting stop and stabilizer bracket in relation to a tubular front horizontal cross member of the support frame of a second, similar shopping cart in which there is a gap between that horizontal cross member and the horizontally disposed, generally parallel, thin, bottom wire elements of the lading-carrying basket of the second cart.

A second troublesome problem that is avoided by use of this invention (in addition to the stabilizing problem) is presented by the fact that because of tolerances in the manufacturing process there is very often (as seen in FIG. 5) a fairly sizable gap 84 at the front end of elevated support frame 24 between tubular horizontal cross member 30 and thin bottom wall wire elements 34c of the lading-carrying basket (all shown in phantom in FIG. 5) with which shopping cart 20 is telescoped. In a newly manufactured shopping cart, gap 84 may be from $\frac{1}{8}"$ to $\frac{3}{8}"$, or even $\frac{1}{2}"$ in extreme cases. When two shopping carts of construction similar to shopping cart 20 are fully telescoped, it is seen from FIG. 5 that in the absence of nesting stop 22, exposed horizontal portion 37b of the rear wire rim can, especially if one of the carts is jostled slightly, be pushed up over tubular element 30 into gap 84. This may cause the two carts to be stuck together so firmly that is is difficult or even impossible to pull the rear cart away from the cart into which it is telescoped.

In use, the end portions of wire rim element 37b sometimes become bowed up somewhat, and it is then even more likely that those portions of the wire rim element will move into gap 84 at either end of element 37b. If this happens, the entire length of wire rim element 37b is more likely to move into gap 84 and thereby cause the two telescoped carts to be stuck together.

As will be seen from FIG. 5, member 22 acts as a nesting stop and prevents the described wedging of one telescoping shopping cart to another.

The above detailed description of this invention has been given for ease of understanding only. No unnecessary limitations should be understood therefrom, as modifications will be obvious to those skilled in the art.

We claim:

1. In a first shopping cart within which a second, similar shopping cart can be nested, each of which shopping carts comprises a tubular elevated support frame having a tubular horizontal cross member at its front end, a tubular chassis frame on which said elevated support frame is mounted, four wheels pivotally secured at the bottom of said chassis frame, and a lading-carrying basket supported on said elevated support frame, said basket comprising a multiplicity of generally parallel, thin wire elements secured to a framework formed of relatively thick wires, said chassis frame, said elevated support frame and said basket of said first shopping cart being tapered inwardly, with the bottom wall of said basket tilted upward, from back to front to permit said second cart to be telescoped within said first cart during storage, the rear wall of said lading-carrying basket of each of said shopping carts being hinged at the top to permit said wall to swing inward into the interior of said basket, said hinged rear wall having a predetermined spacing on each side of its bottom portion between said bottom portion and the respective side wall of said basket when said rear wall is disposed generally vertically, said basket framework formed of relatively thick wires of each of said first and second carts including a rear wire rim member having a horizontally disposed portion, and carrying a plurality of horizontally disposed, generally parallel, thin, bottom wire elements, said tubular horizontal cross member at the front end of the support frame of said second cart and said thin wire elements of the bottom wall of the basket of said second cart having a gap therebetween into which said horizontally disposed portion of said relatively thick rear rim member of the wire framework of said first shopping cart can become wedged when the basket of said second cart is telescoped within the basket of said first cart during storage, a combination nesting stop and stabilizer bracket which comprises:

(a) a bracket having an inverted U-shaped cross section, the bottom end portion of each downwardly extending leg of said U-shaped member defining a downwardly opening notch to receive one end portion of said horizontally disposed portion of said relatively thick rear wire rim member of the framework of the lading-carrying basket of said first shopping cart, the distance between the outer surfaces of said downwardly extending legs being approximately equal to said predetermined spacing on each side of the bottom portion of said hinged rear wall of said first shopping cart; and (b) means for mounting said inverted U-shaped member on said basket cart with said horizontally disposed portion of said relatively thick rear wire rim member positioned within the notches in said legs, whereby (i) said downwardly extending legs of said inverted U-shaped bracket prevent said relatively thick rear wire rim member of said first shopping cart basket from being forced into said gap between said thin wire elements of the bottom wall of said lading-carrying basket and said tubular horizontal cross member at the front end of said elevated support frame of said second shopping cart when the latter is telescoped within said first shopping cart, and (ii) at the same time, said inverted U-shaped member and a similar inverted U-shaped member positioned at the other end portion of said horizontally disposed portion of said rear wire rim member of the lading-carrying basket of said first shopping cart, said inverted U-shaped members being located within the respective aforementioned predetermined spacings on each side of the bottom portion of said hinged rear wall, confine said bottom portion of said hinged rear wall from each side of said first shopping cart basket to stabilize said rear wall in its normal position midway between the side walls of the basket when said rear wall is in its generally vertical position.

2. The combination nesting stop and stabilizer bracket of claim 1 in which said mounting means comprises a hole defined by at least one downwardly extending leg of said inverted U-shaped member to receive connector means for securing said nesting stop and stabilizer bracket to said tubular elevated support frame.

3. The combination nesting stop and stabilizer bracket of claim 2 in which a hole is defined by each of said downwardly extending legs of said inverted U-shaped member to receive connector means for securing said nesting stop and stabilizer bracket on either side of said tubular elevated support frame.

4. The combination nesting stop and stabilizer bracket of claim 2 for use with a shopping cart which includes a side plate attached to said tubular elevated support frame, in which said hole defined by said one downwardly extending leg is positioned to receive connector means for securing said nesting stop and stabilizer bracket to said side plate.

* * * * *